Jan. 1, 1957 M. F. RUDY 2,776,173
RECIPROCATING SHAFT BEARING
Filed April 6, 1954
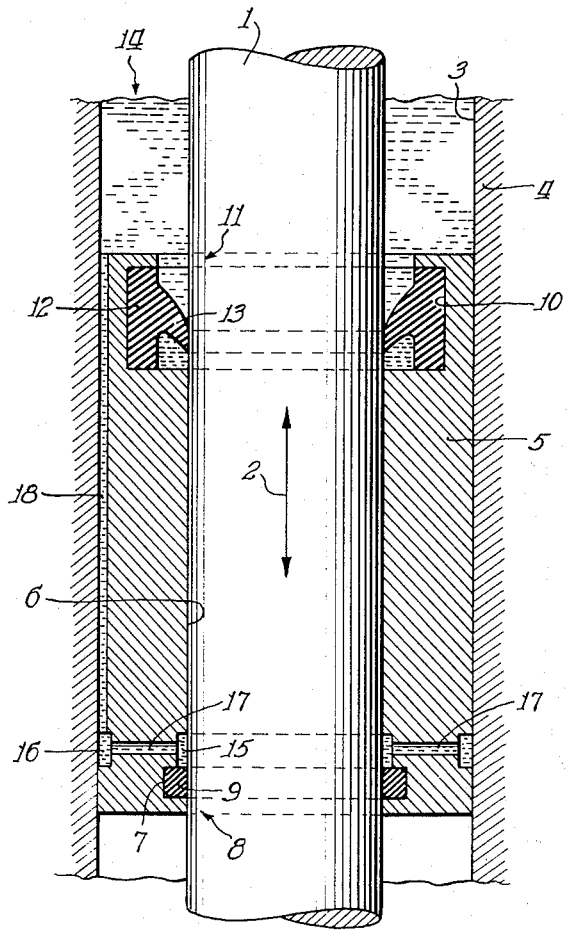
Inventor:
Marion F. Rudy
By: Frank C. Parker

2,776,173
RECIPROCATING SHAFT BEARING

Marion F. Rudy, Northridge, Calif., assignor to Borg-Warner Corporation, Chicago, Ill., a corporation of Illinois Application April 6, 1954, Serial No. 421,259

11 Claims. (Cl. 308—5)

The present invention relates in general to journals or pilot bearings, and is particularly concerned with a journal or pilot bearing for guiding a reciprocating member.

The principal object of the present invention is to provide a journal or pilot bearing having means for providing positive lubrication of the bearing surfaces of the reciprocating and journal members.

A further object of the present invention is to provide a pilot bearing of the aforementioned general type and including a one-way wiper device which is effective to permit lubricant, which adheres to the reciprocating member, to pass by the wiper device into the bearing portions of the reciprocating member and journal and to wipe the film of lubricant from the reciprocating member to prevent its escaping from the bearing surfaces of the journal and reciprocating member. In this connection, the present invention contemplates that the reciprocating member will reciprocate while in contact with a source of fluid lubricant and that a film of the lubricant will adhere to the member and pass by the wiper ring into the space between the journal bearing and the member and that upon movement of the member toward the lubricant source, the wiper ring will be effective to wipe the member clean and thus retain the lubricant between the bearing surfaces.

A further more specific object of the present invention is to provide a fluid lubricant circulating device comprising a shaft adapted to be longitudinally reciprocated, a journal bearing disposed concentrically around the shaft, a source of fluid lubricant disposed at one end of the journal bearing, an annular one-way valve-like member concentrically mounted around the shaft within the journal bearing and adapted to permit a film of the fluid lubricant which adheres to the shaft to pass from the fluid source into the bearing upon movement of the shaft in one direction and to wipe the film of lubricant from the shaft so as to retain it in the bearing upon movement of the shaft in the other direction and including a seal at the other end of the bearing for preventing the escape of the fluid lubricant beyond the journal bearing, and further including means for conveying the fluid lubricant from the other end of the bearing back to the lubricant source.

By means of the fluid circulating device disclosed herein, an adequate supply of fluid lubricant is maintained on the shaft and journal bearing surfaces at all times and due to passages formed in the journal bearing member leading back to the fluid source, there is a minimum of loss of the fluid lubricant during operation of the device.

The present invention finds particular utility in those applications wherein a rather massive reciprocatory member is required to be held in axial alignment and where lubrication of the bearing surfaces between the moving member and the member holding the moving member in axial alignment is a problem. More particularly, the present invention finds utility in applications such as those where a long massive shaft is vibrated at substantially the resonant frequency thereof so that if the proper supply of lubricant for the bearing surfaces between the shaft and journal bearing is not maintained, the bearing surfaces will otherwise rapidly burn out.

The foregoing and numerous other objects and advantages of the present invention will become apparent from the following detailed description when read in conjunction with the accompanying drawing.

Referring now to the drawing, the present invention comprises a shaft 1 adapted to reciprocate longitudinally, as indicated by the double-headed arrow 2. The shaft 1 is disposed within a suitable opening 3 formed through a housing member, indicated fragmentarily at 4. A journal or pilot bearing 5 is disposed within the opening 3 of the housing 4, the journal 5 being fitted sufficiently snugly within the opening 3 so as to be substantially leak-proof with reference thereto. The journal or pilot bearing 5 is provided with a central opening 6 for receiving the shaft 1 and concentrically mounting the shaft 1 within the opening 3. It will be obvious that there is sufficient clearance between the inner surface 6 of the bearing 5 and the outer surface of the shaft 1 to permit relative sliding movement of the shaft 1 within the bearing 5.

The pilot bearing 5 is provided with an annular internal peripheral groove 7 at one end, designated generally by reference numeral 8 and an O-type sealing ring 9 is disposed in the groove 7 and compressed against the outer surface of the shaft 1 in order to provide a seal between the shaft 1 and the bearing 5 at the one end 8 of the bearing 5. The bearing 5 is provided with an annular internal peripheral groove 10 at the other end 11 thereof and a one-way wiper or sealing ring 12 is mounted within the groove 10 at the other end 11 of the bearing 5. The one-way wiper ring 12 is preferably made of some resilient or flexible material such as rubber and is provided with an annular blade portion 13 adapted to contact the outer periphery of the shaft 1.

Adjacent the end 11 of the bearing 5 is a fluid lubricant source 14, which, in the present disclosure, comprises the space between the shaft 1 and the opening 3 of the housing 4 and closed at the bottom by the upper end 11 of the bearing 5. It will, of course, be understood that it is not necessary that the shaft 1 reciprocate vertically, and therefore the lubricant source 14 may be of any desired shape or form. It will suffice to say that the fluid lubricant within the source 14 contacts the outer surface of the shaft or reciprocable member and wets the outer surface thereof.

The journal or pilot bearing 5 is provided with an annular internal collector ring or groove 15 which is connected with an annular external collector ring 16 by means of a plurality of radially extending passages 17. The collector ring 16 communicates with the lubricant source 14 by means of one or more longitudinally extending passages 18 formed in the journal bearing 5.

In the operation of the fluid lubricating or circulating device disclosed herein it is contemplated that the fluid lubricant from the source 14 will wet the outer surface of the shaft 1. During the movement of the shaft 1 in the direction from the source 14 toward the bearing 5 (downwardly in the drawing) a thin film of the fluid lubricant collects on the outer surface of the shaft and tends to adhere thereto. The blade portion 13 of the one-way wiper ring 12 is adapted and arranged to flex outwardly during the movement of the shaft 1 downwardly so that the film of lubricant which collects on the shaft in the vicinity of the upper end 11 of the bearing, moves into the region within the bearing 5. Upon movement of the shaft 1 upwardly, or in the opposite direction, the blade portion 13 of the one-way wiper ring is effective to wipe the film of lubricant from the shaft 1 and collect this lubricant within the bearing surface 6 of the bearing 5 and the outer surface of the shaft 1. It will be apparent that the reciprocating shaft 1 and one-way wiper ring 12 thus tend to act as a fluid lubricant pump, pumping the fluid lubricant from the source 14 into the space between the bearing 5 and the shaft 1. After a short interval of time, fluid lubricant within the bearing 5 and between the bearing and shaft will work its way toward the one end 8 of the bearing where it will tend to collect in the internal collector ring 15. The O-ring seal 9 is effective to prevent the leakage of the fluid lubricant beyond the end 8 of the bearing. The fluid lubricant in the collector ring 15 then passes outwardly through the radial passages 17 into the external collector ring 16 and from the external collector ring 16, the fluid lubricant returns to the source 14 through the longitudinal passages 18.

It will thus be seen that upon reciprocation of the shaft 1, fluid lubricant is continuously circulated from the source 14 through the bearing surfaces of the journal bearing 5 and shaft 1 and back to the source 14 through the collector rings 15 and 16 and passages 17 and 18. It is therefore apparent that the present invention provides an efficient and simple fluid lubricating device for a journal bearing adapted to reciprocably mount a longitudinally reciprocable shaft or other member.

It is contemplated that, if desired, the shaft 1 could reciprocate horizontally and the invention would obviously function in substantially the same manner as disclosed herein. Further, it is not essential that the reciprocable shaft be completely surrounded by the journal bearing 5, as it is conceivable that in certain instances where the reciprocable member is moved horizontally, it need only be supported on the lower side thereof so that the wiper device and sealing device disposed at opposite ends of the journal bearing 5 need only extend around that portion of the reciprocable member 1 actually in bearing engagement with the bearing member.

As is apparent, the disclosure of the present case is more or less schematic and rather than being primarily for the purpose of showing constructional details, the present disclosure is for the purpose of illustrating the principles of the present invention and, accordingly, it is contemplated that numerous changes and modifications may be made therein without departing from the spirit or scope of the invention.

What is claimed is:

1. A pilot bearing comprising, in combination, a reciprocable shaft, a relatively stationary sleeve member including means defining a cylindrical opening therethrough and adapted to receive said reciprocable shaft therein and to provide a sliding fit for the shaft within said sleeve member, means defining a source of fluid lubricant at one end of said sleeve member and around said shaft, a pair of annular sealing devices disposed at opposite ends of said sleeve member and around said shaft, one of said sealing devices having a sliding fit around said shaft being disposed adjacent said fluid lubricant source and adapted to permit a film of lubricant on the shaft to pass upon movements of said shaft in a direction from said lubricant source toward the sleeve member and to wipe the film of lubricant from said shaft upon movements of the shaft in the opposite direction, said other sealing device substantially eliminating passage of the lubricant, and said sleeve member including means defining a lubricant passageway extending from within said sleeve member to said fluid lubricant source whereby the fluid lubricant is continuously circulated from said source through the space between said shaft and sleeve member and back to said source for thereby continuously lubricating the engaging portions of said shaft and bearing.

2. A pilot bearing comprising in combination, a reciprocable shaft, a relatively stationary sleeve bushing for reciprocably mounting the shaft, means providing a fluid lubricant source at one end of said bushing, sealing means at each end of said bushing and disposed between the bushing and shaft, one of said sealing means being disposed adjacent the lubricant source and slidably mounted around said shaft and effective to prevent passage of the lubricant toward said source and to permit a film of the lubricant on the shaft to pass into the bushing from said source to thereby provide lubrication between the bushing and shaft, and said bushing including means defining a lubricant passage extending from within said bushing to said source for thereby permitting continuous circulation of the fluid lubricant from said source between the bushing and shaft and back to the source.

3. A pilot bearing comprising, in combination, a reciprocable shaft, a relatively stationary sleeve bushing for reciprocably mounting the shaft, means providing a fluid lubricant source at one end of said bushing, a sealing ring disposed at one end of the bushing between the bushing and shaft, a one-way wiper ring disposed around the shaft and adjacent the lubricant source and effective to prevent passage of the lubricant toward said source and to permit a film of lubricant on the shaft to pass into the bushing from said source to thereby provide lubrication between the bushing and shaft, and said bushing including means defining a lubricant passage extending from within said bushing to said source for thereby permitting continuous circulation of the fluid lubricant from said source between the bushing and shaft and back to the source.

4. A pilot bearing comprising, in combination, a reciprocable shaft, a relatively stationary sleeve bushing for reciprocably mounting the shaft, means providing a fluid lubricant source at one end of said bushing, a sealing ring disposed at one end of the bushing between the bushing and shaft, a one-way wiper ring disposed around the shaft and adjacent the lubricant source and effective to prevent passage of the lubricant toward said source and to permit a film of the lubricant on the shaft to pass into the bushing from said source to thereby provide lubrication between the bushing and shaft, said sealing ring being effective to prevent the escape of fluid lubricant beyond said one end of said bushing, and said bushing including means defining a lubricant passage extending from within said bushing to said source for thereby permitting continuous circulation of the fluid lubricant from said source between the bushing and shaft and back to the source.

5. A pilot bearing comprising, in combination, a reciprocable shaft, a relatively stationary sleeve bushing for reciprocably mounting the shaft, means providing a fluid lubricant source at one end of said bushing, a rubber O-ring disposed in an annular groove formed in the inner surface and at one end of said bushing for providing a seal between said bushing and shaft, a rubber one-way wiper ring disposed around the shaft and adjacent the lubricant source and effective to prevent passage of the lubricant toward said source and to permit a film of the lubricant on the shaft to pass into the bushing from said source to thereby provide lubrication between the bushing and shaft, and said bushing including means defining a lubricant passage extending from within said bushing to said source for thereby permitting continuous circulation of the fluid lubricant from said source between the bushing and shaft and back to the source.

6. A pilot bearing comprising, in combination, a reciprocable shaft, a relatively stationary sleeve bushing for reciprocably mounting the shaft, means providing a fluid lubricant source at one end of said bushing, a rubber O-ring disposed in an annular groove formed in the inner surface and at one end of said bushing for providing a seal between said bushing and shaft, a rubber one-way wiper ring disposed around the shaft and adjacent the lubricant source and effective to prevent passage of the lubricant toward said source and to permit a film of the lubricant on the shaft to pass into the bushing from said source to thereby provide lubrication between the bushing and shaft, said rubber O-ring being effective to prevent the escape of fluid lubricant beyond said one end of said bushing, and said bushing including means defining a lubricant passage extending from within said bushing to said source for thereby permitting continuous circulation of the fluid lubricant from said source between the bushing and shaft and back to the source.

7. A fluid lubricant circulating device comprising, in combination, a shaft adapted to be longitudinally reciprocated, a journal bearing disposed concentrically around said shaft, a source of fluid lubricant disposed at one end of said journal bearing, an annular one-way valve concentrically disposed around said shaft within said journal bearing and adapted to permit a film of the fluid lubricant adhering to the shaft to pass from said source into the bearing upon movements of the shaft in one direction and to wipe the film of lubricant from the shaft to retain it in the bearing upon movements of the shaft in the other direction, a seal disposed within the bearing and around the shaft at the other end of the bearing, and means for conveying the fluid lubricant from the other end of said bearing back to said lubricant source.

8. A fluid lubricant circulating device comprising, in combination, a shaft adapted to be longitudinally reciprocated, a sleeve member for slidably receiving said shaft therein, a source of fluid lubricant disposed at one end of said sleeve member, a wiper secured in said one end of said sleeve member adjacent said source of fluid lubricant and comprising a flexible member surrounding said shaft and effective to permit a film of the fluid lubricant adhering to the shaft to pass into the sleeve member upon relative movements of the shaft from said lubricant source, said flexible wiper being effective to wipe said fluid lubricant film from said shaft upon relative movements of said shaft from said sleeve member toward said lubricant source for thereby providing a supply of the lubricant between said shaft and sleeve member, a seal provided at the other end of said sleeve member and disposed between the sleeve member and shaft for preventing loss of the fluid lubricant, and said sleeve member including means defining lubricant conveying passages for conveying the fluid lubricant from said other end of said sleeve member back to said lubricant source.

9. In combination with a reciprocable member and a relatively stationary mounting journal, means for lubricating the bearing surfaces of the reciprocable member and the relatively stationary mounting journal comprising a source of lubricant disposed adjacent said journal and in contact with a portion of said reciprocable member projecting beyond the mounting journal, a one-way wiper seal disposed between said reciprocable member and said mounting journal and adapted and arranged so as to permit a film of said lubricant on the reciprocable member to pass the wiper and reach said bearing surfaces upon movement of said reciprocable member from said source toward said journal, and said one-way wiper seal being effective to wipe said film of lubricant from the reciprocable member upon movements thereof in the opposite direction to thereby maintain a continuous supply of lubricant for said bearing surfaces during reciprocation of said member.

10. In combination with a reciprocable member and a relatively stationary mounting journal, means for lubricating the bearing surfaces of the reciprocable member and the relatively stationary mounting journal comprising a source of lubricant disposed adjacent one end of said journal and in contact with a portion of said reciprocable member projecting beyond the mounting journal, a resilient wiper disposed between said reciprocable member and said mounting journal and adapted and arranged so as to permit a film of said lubricant on the reciprocable member to pass the wiper and reach said bearing surfaces upon movements of said reciprocable member from said source toward said journal, said wiper being effective to wipe said lubricant film from the reciprocable member upon movements thereof in the opposite direction to thereby maintain a continuous supply of lubricant for said bearing surfaces during reciprocation of said members, and a seal at the opposite end of said journal disposed between the journal and said reciprocable member for preventing loss of said lubricant.

11. In combination with a reciprocable member and a relatively stationary mounting journal, means for lubricating the bearing surfaces of the reciprocable member and the relatively stationary mounting journal comprising a source of lubricant disposed adjacent one end of said journal and in contact with a portion of said reciprocable member projecting beyond the mounting journal, a resilient wiper disposed between said reciprocable member and said mounting journal and adapted and arranged so as to permit a film of said lubricant on the reciprocable member to pass the wiper and reach said bearing surfaces upon movements of said reciprocable member from said source toward said journal, said wiper being effective to wipe said lubricant film from the reciprocable member upon movements thereof in the opposite direction to thereby maintain a continuous supply of lubricant for said bearing surfaces during reciprocation of said members, and a seal at the opposite end of said journal disposed between the journal and said reciprocable member for preventing loss of said lubricant, and means defining lubricant passages leading from said bearing surfaces back to said source for providing a continuous circulation of lubricant from the source to the bearing surfaces and back to the source.

References Cited in the file of this patent
UNITED STATES PATENTS

| | | |
|---|---|---|
| 2,467,510 | Van den Burg | Apr. 19, 1949 |
| 2,570,117 | Hallstrand | Oct. 2, 1951 |
| 2,626,839 | Creson et al. | Jan. 27, 1953 |